Dec. 4, 1945.  M. ROGOS  2,390,175
DIAMOND HOLDING TOOL
Filed July 13, 1944
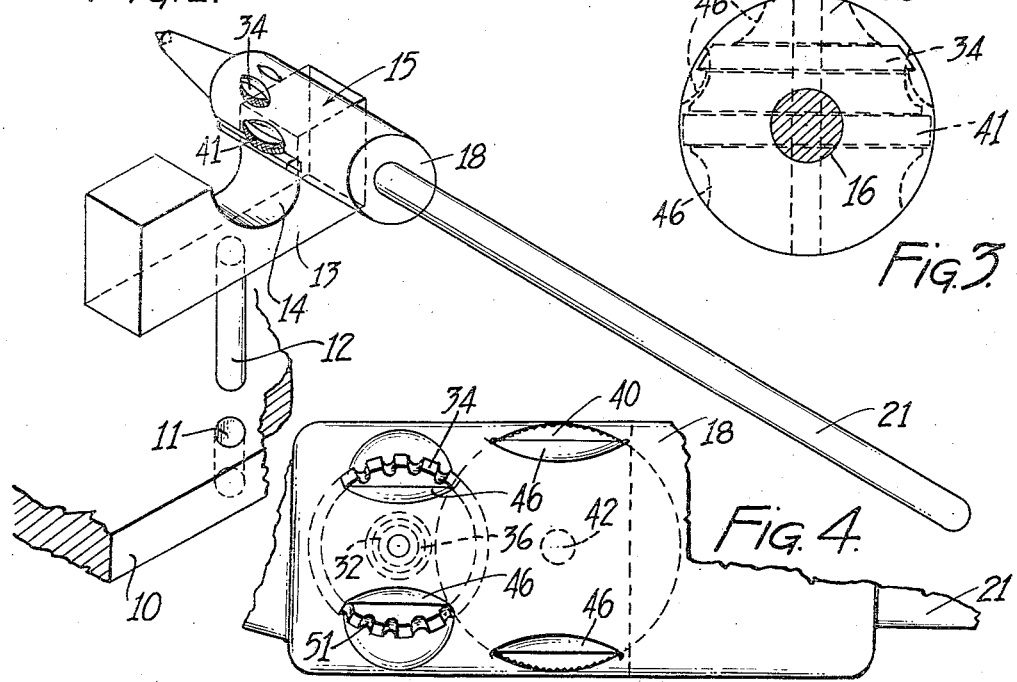
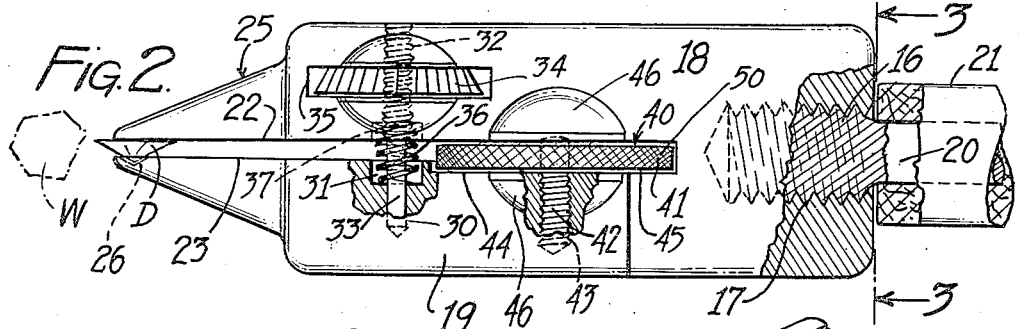
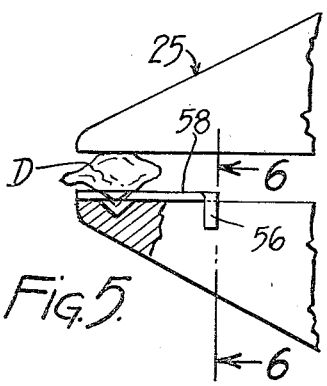
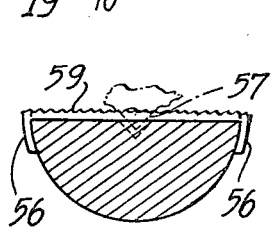
INVENTOR.
MORRIS ROGOS
BY
John J. Lynch
Atty.

Patented Dec. 4, 1945

2,390,175

UNITED STATES PATENT OFFICE 2,390,175

DIAMOND HOLDING TOOL

Morris Rogos, Jackson Heights, N. Y.

Application July 13, 1944, Serial No. 544,695

4 Claims. (Cl. 125—30)

This invention relates to holding tools and in particular to a type employed in clamping a cutting diamond in position to be used in trimming another diamond.

In the diamond cutting art, the stone to be trimmed and worked is usually cemented to a spindle or turning member and the diamond that does the actual cutting is likewise cemented in the metal nose portion of a stick that is manipulated manually to bring the cutting stone into position against the work. Considerable difficulty is experienced by the operator in maintaining the cutting stone in place in the end of the stick and in adjusting it from time to time to present the pointed edges thereof to the work.

It is an object of the present invention to eliminate the trouble present in the use of the present sticks and provide a novel form of holding device for use in stick form, which will be adjustable to shift the cutting diamond at will and which can be used to hold all kinds of diamonds, that is those used for gems and those known in the trade as commercial diamonds and not otherwise fit for gem use.

A further object of the invention is to provide a clamping tool to which a filler piece may be added as desired to permit the use of smaller diamonds of irregular shape and to so arrange the operating end of the stick type clamp that it can be readily adjusted and will hold the gem or commercial diamond securely in place without the use of cement.

In my application for patent filed May 30, 1944, Serial No. 537,996 for Automatic diamond cutting machine, I have shown a diamond holding clamp for use in the machine and the subject matter of the instant application is an improvement over the clamp illustrated in said application, but the present type of clamping head while illustrated as for use on the end of a gem cutter's stick, may be employed in the machine illustrated in said application.

Other objects and structural details of the invention will be apparent from the following description when read in connection with the accompanying drawing, in which:

Figure 1 is a view in isometric persepective showing the method of using my improved stick and the novel construction of the diamond clamping head thereof, Figure 2 is an enlarged view in side elevation, parts being shown in section, illustrating the construction of the clamping head, Figure 3 is a section on the line 3—3 of Figure 2 showing the relative arrangement of the clamp adjusting means, Figure 4 is a fragmentary top plan view of the clamping head illustrated in Figure 3, Figure 5 is an enlarged view of the nose portion of the clamp showing the use therewith of a filler piece for the purpose of using commercial or rough shaped diamonds of different sizes in the clamp, Figure 6 is a section on the line 6—6 of Figure 5, and Figure 7 is a view in perspective showing how the filler piece is attached to the nose portion of the clamp.

Referring to the drawing in detail, 10 indicates a work table in an opening 11 of which is arranged the spindle 12 of a tool support 13. The latter is in the nature of a cradle having a central trough 14 providing a rest for the clamping end 15 of the diamond cutting tool that is known in the trade as a stick and which is manipulated by the cutter to trim and otherwise work a diamond indicated in Figure 2 as W.

The stick consists of a metal rod 20, having a threaded end 16 screwed into the threaded bore 17 of the cylindrical body piece 18 of a clamp combination including said body member and a jaw portion 19 adjustably attached thereto. The rod 20 is preferably covered by a wood sleeve 21 to provide a good hand hold for the operator.

The head of the tool presents the body piece 18 and the jaw piece 19 whose opposed faces 22 and 23 respectively provide a slot extending laterally of the tool and arranged to receive between said faces and at the extreme end or nose ends of the clamp 25, the cutting diamond D. In either face 22 or 23 I may provide a shallow recess 26 for receiving the collet or pointed portion of the diamond, so that the flat face thereof is flatly positioned against the opposite face and the stone is securely held in place from turning.

The jaw member 19 is provided with a bore 30 and concentric recess 31, into the bore of which is force fitted a threaded stud that extends through a bore 32 in the body piece 18. The stud 33 is threaded into and through an adjusting nut or wheel 34 whose outer edge is tapered and fluted to facilitate turning and also to fit the circular contour of the tool body. The wheel 34 is positioned freely in a slot 35 in the member 18 and when it is adjusted to release the stud, a spring 36 surrounding the stud and seated in the recess 31 and a like recess 37 in the body 18, separates the body and the jaw members so that the diamond clamped therebetween can be turned or otherwise adjusted.

When the wheel 34 is revolved to move the jaw and body toward each other in clamping action, the auxiliary clamp screw 40 is adjusted to jam the body and jaw members apart at their rear ends so that the nose portions thereof will not only be maintained in parallel relation but will effectively hold the stone in place. The jamming action of screw 40 is effective when the wheel 41 secured to the threaded stud 42 is rotated to raise the stud outwardly in the threaded bore 43 of clamp piece 19. The latter is also provided with a stepped face portion 44 to provide a space for the wheel to permit closing of the jaws to the maximum requirement, the space being indicated as at 45. The body and jaw members are recessed on their exterior faces as at 46 adjacent the space 45 and the slot 35 to provide easy finger access to the adjusting wheels, which are positioned and shaped to conform closely to the contour of the cylindrical body shape of the clamping head. The edges of the wheels 34 and 41 are knurled as at 50 or slotted as at 51 so that they may be turned by a suitable tool if need be.

When the poorer grade of commercial diamonds are used, means is necessary to adopt the clamping jaws to the sizes of the diamonds and to this end, I may use a filler piece 55 made of relatively soft metal such as brass and having ears 56 struck out at one end thereof to clip over the edge of the nose of the clamp members so that a recess in the latter is engaged by a dimple or projection 57 formed in the filler face 58 which is knurled or otherwise roughened as at 59. The fillers may be made of varying thicknesses for accommodating small or large stones, and as they are readily removable may be snapped into place or removed without the use of tools or loss of time. The diamond that is used as the cutter is shifted often so that its points are worn down and it becomes almost round and at the same time the work diamond is being perfectly rounded. The tool construction facilitates the quick and often shifting of the tool diamond.

While I have described what I consider to be a highly desirable embodiment of my invention, it is obvious that changes in form could be made without departing from the spirit of my invention, and I therefore, do not limit myself to the exact form herein shown and described, nor to anything less than the whole of my invention as hereinbefore set forth and as hereinafter claimed.

What I claim as new and desire to secure by Letters Patent is:

1. In a diamond holding tool, in combination, a body member, a jaw member, a rod threaded into one of said members and constituting a handle for the tool, means for adjusting said members toward and away from each other including a threaded stud, a spring for yieldably separating the members and an adjusting wheel on said stud, nose portions on said members presenting opposed faces between which a cutting diamond is held upon clamping movement of said adjusting means, and an auxiliary jamming means for co-operation with said adjusting means for maintaining the jaws in parallel clamping relation.

2. In a diamond holding tool, in combination, a body member, a jaw member, an adjusting screw in said jaw member having a finger disk, said disk being disposed between the body and jaw members, a stud in said jaw member, a wheel threaded to said stud and adjustable to position the jaw and body members relatively to each other, said wheel being shaped on its peripheral edge to conform to the outer contour of said body member, and tapered nose portions on said members arranged for coacting diamond clamping relation.

3. In a diamond holding tool of the character set forth in claim 2, including an offset step portion on one of said members providing a rest for the adjusting screw, and a diamond positioning recess in one of said members.

4. In a diamond holding tool, in combination, a body member, a jaw member, nose portions on each member presenting opposed diamond clamping faces an adjusting screw in said jaw member having a finger disk, said disk being disposed between the body and jaw members, a stud in said jaw member, a wheel threaded to said stud and adjustable to position the jaw and body members relatively to each other, a filler piece arranged to be positioned over one end of one of said nose portions and presenting a roughened diamond engaging face and clip extensions on the edges of said filler member for self seating said filler in position on the nose portion.

MORRIS ROGOS.